US007444852B2

(12) United States Patent
Fokkelman et al.

(10) Patent No.: US 7,444,852 B2
(45) Date of Patent: Nov. 4, 2008

(54) METHOD FOR ADAPTING A MEASURED VALUE OF AN AIR MASS SENSOR

(75) Inventors: Joris Fokkelman, Tegernheim (DE); Michael Käsbauer, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 10/597,616

(22) PCT Filed: Feb. 1, 2005

(86) PCT No.: PCT/EP2005/050424

§ 371 (c)(1), (2), (4) Date: Aug. 1, 2006

(87) PCT Pub. No.: WO2005/073542

PCT Pub. Date: Aug. 11, 2005

(65) Prior Publication Data

US 2008/0141975 A1 Jun. 19, 2008

(30) Foreign Application Priority Data

Feb. 2, 2004 (DE) ...................... 10 2004 005 134

(51) Int. Cl.
*G01D 18/00* (2006.01)

(52) U.S. Cl. ...................................................... 73/1.01

(58) Field of Classification Search .................. 73/1.01, 73/116, 119 R; 123/350
See application file for complete search history.

(56) References Cited

U.S. PATENT DOCUMENTS

| | | | | |
|---|---|---|---|---|
| 6,186,116 | B1 | 2/2001 | Armstrong et al. | 123/350 |
| 6,237,563 | B1 * | 5/2001 | Froehlich et al. | 123/350 |
| 6,370,935 | B1 | 4/2002 | He et al. | 73/1.34 |
| 6,571,613 | B1 | 6/2003 | Berger et al. | 73/118.2 |
| 6,834,645 | B2 | 12/2004 | Tazikawa et al. | 123/674 |
| 6,898,511 | B2 | 5/2005 | Denz et al. | 701/114 |

FOREIGN PATENT DOCUMENTS

| | | | |
|---|---|---|---|
| DE | 19950146 | A1 | 4/2000 |
| DE | 10054199 | A1 | 5/2002 |
| DE | 19927674 | A1 | 12/2002 |
| DE | 10132833 | A1 | 1/2003 |
| DE | 10251875 | A1 | 7/2003 |
| EP | 0976922 | A2 | 6/1999 |

OTHER PUBLICATIONS

International Search Report and Written Opinion for International Application No. PCT/EP2005/050424 (14 pages), Jun. 15, 2005.

* cited by examiner

*Primary Examiner*—Hezron E. Williams
*Assistant Examiner*—Tamiko D Bellamy
(74) *Attorney, Agent, or Firm*—Baker Botts L.L.P.

(57) ABSTRACT

A method for adapting a measured value (MW1) of an air mass sensor comprises the steps pf determining a correction value (KW) in the event of predetermined operating conditions (BB1), namely depending on the measured value (MW1) and a comparative value (VW) which in turn depends on at least one additional measured value (MW2) of a second sensor. An adaptation value (AD1) is adapted depending on the correction value (VW), on the duration (D_AD1) since the last determination of the adaptation value (AD1) and on the change of the adaptation value (AD1) since the last adaptation of the adaptation value (AD1). Subsequently measured values (MW1) are corrected using the adaptation value (AD1).

14 Claims, 5 Drawing Sheets

METHOD FOR ADAPTING A MEASURED VALUE OF AN AIR MASS SENSOR

CROSS-REFERENCE TO RELATED APPLICATIONS

This application is a U.S. national stage application of International Application No. PCT/EP2005/050424 filed Feb. 1, 2005, which designates the United States of America, and claims priority to German application number DE 10 2004 005 134.8 filed Feb. 2, 2004, the contents of which are hereby incorporated by reference in their entirety.

TECHNICAL FIELD

The invention relates to a method for adapting a measured value of an air mass sensor. The air mass sensor can in particular be arranged in an internal combustion engine for recording an air mass flow in cylinders of the internal combustion engine.

BACKGROUND

These types of air mass sensor record the air mass flow which flows into a collector. The collector communicates via induction tubes with cylinders of the internal combustion engine and supplies these with fresh air.

Ever more stringent legal requirements relating to pollutant emissions in motor vehicles make it necessary to set the air/fuel mixture in the individual cylinders of the internal combustion engine very precisely. This requires that the air mass drawn into the relevant cylinder is determined very precisely. The air mass sensor allows the air mass flowing into the collector to be determined very precisely. By means of corresponding physical models of the collector and the induction tubes and of the induction behavior of the cylinders of the internal combustion engine, the air mass flowing into the cylinders of the internal combustion engine can be determined very precisely.

Known air mass measurers are regularly embodied in the form of a Whetstone bridge, with a high-resistance temperature-dependent resistor to compensate for the temperature of the induction air in one branch and a low-resistance temperature in the other branch of which the heat performance is characteristic for the air mass flowing past. The heating resistor is generally embodied as a so-called hot-film resistor. During the operation of the internal combustion engine particles of dirt and also oil droplets build up on the hot-film resistor. The result is that the behavior of the measuring resistor changes.

SUMMARY

The object of the invention is to create a method for adapting a measured value of an air mass sensor that ensures precise measurement values of the air mass sensor simply and immediately over a long lifetime of the air mass sensor.

The outstanding feature of the invention is a method for adapting a measured value of an air mass sensor, in which a correction value, if predefined operating conditions exist, is determined depending on the measured value and a comparison value, which is determined depending on at least one further measured value of a further sensor. An adaptation value is adapted depending on the correction value, the duration since the adaptation value was last determined and on the change of the adaptation value since the last adaptation of the adaptation value. Measured values subsequently recorded are corrected with the adaptation value. The adaptation of the adaptation value, depending on the duration since the adaptation value was last determined, can be ensured in that. Depending on the frequency of the adaptation of the adaptation value, a very precise learning of the adaptation value and thereby in the final analysis, correction of the measurement value can take place. The fact that the adaptation of the adaptation value is also dependent on the adaptation value since the last adaptation of the adaptation value additionally enables extraordinary changes of the air mass sensor to be detected and correspondingly taken into account.

In an advantageous embodiment of the invention, as the duration since the last adaptation of the adaptation value increases, the adaptation value is adapted more heavily depending on the correction value. This enables account to be easily taken of the fact that, with a less frequent adaptation of the adaptation value, ageing effects of the air mass sensor are more marked and can thus be compensated for again by the heavier adaptation depending on the correction value.

In a further advantageous embodiment of the invention, when the adaptation value is changed, which is characteristic of an unauthorized modification to the air mass sensor, an initialization value is assigned to the adaptation value. This type of unauthorized modification to the air mass sensor can for example be the replacement of the air mass sensor, without a control device which records and further processes the measuring signals of the air mass sensor being informed. With a motor vehicle, this can for example be a replacement of the air mass sensor outside a workshop authorized to carry out this work.

An unauthorized modification can be detected especially simply by a negative change of the adaptation value occurring, the amount of which is greater than a predefined first threshold value, and a duration since the last determination of the correction being less that a predefined second threshold value The duration can in this case especially simply be a period of time, but it can also be dependent on the operating life of the air mass sensor and thus for example, for an internal combustion engine, be dependent on a specific number of driving cycles or a distance covered in the interim.

It is further especially advantageous, if an extraordinary contamination of the air mass sensor is detected, and if this done when a positive change of the adaptation value, of which the amount is greater than a predefined third threshold value, and a duration since the last determination of the correction value which is less than a predefined fourth threshold value are characteristic of an extraordinary contamination of the air mass sensor. Then, if an extraordinary contamination is detected there can simply be an error reaction.

Advantageously this error reaction is an indicator of an error which occurs so that a fault in a motor vehicle in which the air mass sensor can be located recognizes that an error has occurred. The error can thus be indicated visually or audibly for example.

It is also advantageous for at least one first correction value and a second correction value to be determined. The first correction value is determined if predefined first operating conditions exist. The second correction value is determined, if predefined second operating conditions exist. Depending on the first correction value a first adaptation value is adapted. Depending on the second correction value a second adaptation value is adapted. Measured values of the air mass sensor recorded subsequently are corrected with an adaptation value which, depending on the current operating conditions, is interpolated between the first and the second adaptation value. This enables appropriately adapted adaptation values to be determined in a simple manner for different operating conditions and used for further correction of the measured values. If more than two correction values are determined, for corresponding predefined further operating conditions, corresponding additional adaptation values are then also adapted and the adaptation value is then also corrected by interpolation between the first, second and further adaptation values. Thus, with a growing number of adaptation values for different operating conditions, extremely precise correction of the measured value of the air mass sensor can be guaranteed over a very wide operating range of the air mass sensor.

BRIEF DESCRIPTION OF THE DRAWINGS

Exemplary embodiments of the invention are explained below with reference to schematic diagrams. The figures show.

Elements for which the construction and function are the same are labeled by the same reference symbols in all figures.

DETAILED DESCRIPTION

Figure 1:
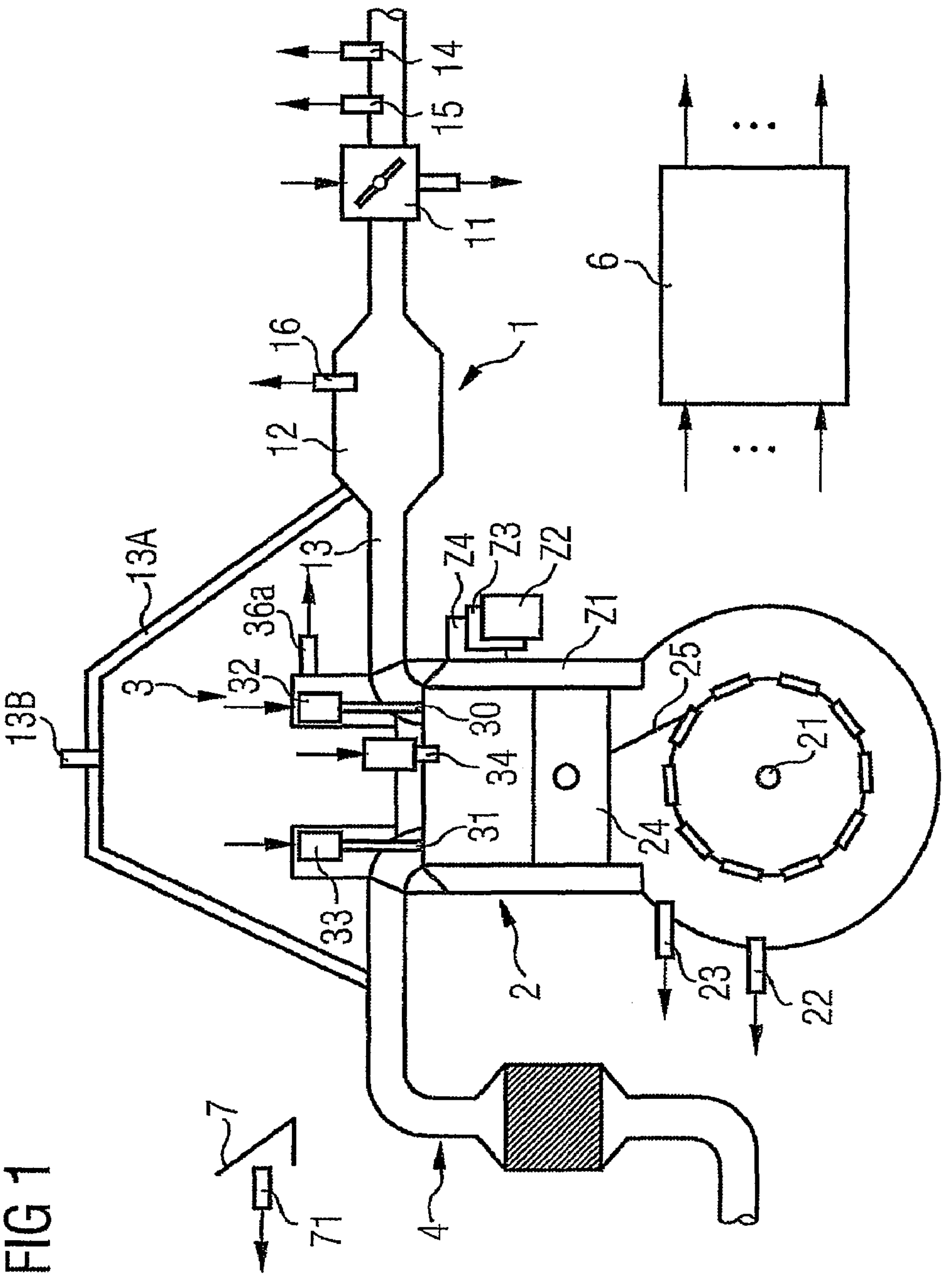
FIG. 1 an internal combustion engine with an air mass sensor.

An internal combustion engine (FIG. 1) comprises an induction tract 1, an engine block 2, a cylinder head 3 and an exhaust gas tract 4. The induction tract 11 preferably comprises a throttle valve 12, also a collector 13 and an induction tube 1, which is routed through to the cylinder Z1 via an inlet channel in the engine block. Furthermore an exhaust gas recirculation device 13A can open out into the induction tract 1, preferably in the area of the collector 12, which routes exhaust gases from the exhaust gas tract 4 back into the induction tract 1. The volume of the recirculated exhaust gas can be controlled using an exhaust gas recirculation valve 13B. The engine block further comprises a crankshaft 21, which is coupled via a connecting rod 25 to the piston 24 of the cylinder Z1.

The cylinder head 3 comprises valve gear with an inlet valve 30, an exhaust valve 31 and valve actuating mechanisms 32, 33. The gas inlet valve 30 and the gas outlet valve 31 are driven in this case via a camshaft. The cylinder head 3 further includes an injection valve 34.

A control device 6 is also provided which can also be seen as a device for controlling the internal combustion engine and to which sensors are assigned which record different measurement variables and determine the measured value of the measurement variable in each case. The control device 6 determines setpoint values depending on at least one of the measurement variables, which are then converted into one or more control signals for controlling the actuation elements by means of the appropriate actuation drives.

The sensors are a pedal position sensor 71, which detects the position of the gas pedal 7, an air mass measurer 14, which detects an air mass flow upstream from the throttle valve 11, a temperature sensor 15 which detects the induction air temperature, a pressure sensor 16, which detects the induction tube pressure, a crankshaft angle sensor 22, which detects a crankshaft angle to which a speed N is then assigned, a further temperature sensor 23, which detects a coolant temperature, a camshaft angle sensor 36*a*, which detects the camshaft angle. Depending on the form of embodiment of the invention, any given subset of the said sensors or also additional sensors can be present.

The actuation elements are for example the throttle valve 11, the gas inlet and outlet valves 30, 31, the injection valve 34 and the exhaust gas recirculation valve 13B.

As well as the cylinder Z1 further cylinders Z2-Z4 are also provided to which corresponding actuation elements are also assigned.

A program for determining an adaptation value which is stored in the control device 6 is run during operation of the internal combustion engine. The program is started in a step S1 (FIG. 2A) in which variables are initialized if necessary. The program is preferably started shortly after the beginning of the engine start sequence.

In a step S2 current operating conditions BB are determined. This is preferably done depending on the speed N, the throttle setting THR, the induction air temperature T and the exhaust gas recirculation rate EGR and where necessary also depending on further variables or also depending on just some of the specified variables.

A check is made in a step S3 as to whether the current operating conditions BB are the same as predefined first operating conditions BB1. The predefined first operating conditions BB1 can for example be that the speed N has a value 1,000 RPM and the throttle setting, the temperature T and the exhaust gas recirculation rate assume predefined, where possible constant values.

If the condition of step S3 is not fulfilled, processing is continued at a step S4 in which the program idles for a predefined waiting time T_W, before processing is continued again at step S2. If on the other hand the condition of step S3 is fulfilled, a first measured value MW1 is determined in a step S5. The first measured value MW1 is preferably the measured value of the air mass sensor 14.

In a step S6 a comparison value VW is determined, and this value depends on at least a second measured value MW2 of a further sensor, of the induction tube sensor 16 for example. Depending on the second measured value MW2 the comparison value is then determined, for example using a physical model, said value preferably being a comparison value of the air mass flow.

In a step S7 a first correction value KW1 is determined depending on the first measured value MW1 and the comparison value VW. This can for example be done by forming the difference between the comparison value VW and the first measured value MW1.

In a step S8 a first adaptation value AD1 is determined. An [n] in this case refers to the value actually computed and an [n-1] means a value determined during the previous adaptation. The current first adaptation value AD1 is then determined depending on the previous first adaptation value AD1 and the first correction value KW1. This is preferably done using a first-order filter. It can however also be done using a higher-order filter or in another way with which the person skilled in the art is familiar.

In a step S10 a check is performed as to whether the first adaptation value AD1, which was currently determined is greater than a predefined extreme value EXTR as regards its size The extreme value is predefined so that if the extreme value is exceeded it can be assumed that exceeding the value in this way is not possible because of the properties of the air mass sensor and the signal processing and that thereby a restriction to this value must be undertaken. For example the extreme value EXTR can amount to 10 to 20% of the comparison value determined.

If the condition of step S10 is fulfilled, the in a step S11 the first adaptation value AD1, depending on its leading sign, is restricted to a minimum value AD MIN or to a maximum value AD MAX.

If on the other hand the condition of step S10 is not fulfilled, then in a step S12 (FIG. 2B) in check is made as to whether the change of the first adaptation value AD1 which is determined by means of forming the difference between the current and the preceding first adaptation value AD1, is characteristic for an unauthorized modification of the air mass sensor. The change of the first adaptation value AD1 is for example characteristic of an unauthorized modification UM if it has a leading sign which depends on the relevant air mass sensor and its amount exceeds and air mass sensor-dependent value and at the same time the duration since the previous adaptation is less than a predefined value. This type of unauthorized modification can arise for an air mass sensor for example when the heating resistor embodied as a hot-film resistor has been cleaned, but this information is not yet available to the control device 6. If the condition of step S12 is fulfilled, then in a step S13 the first adaptation value AD1 is given an initialization value AD1_INI for the first adaptation value AD1. This initialization value AD1_INI can for example amount to zero.

If on the other hand the condition of step S12 is not fulfilled, then in a step S14 the first adaptation value AD1 is determined once again and this time depending on the duration D_AD1 since the last valid adaptation of the first adaptation value AD1, the preceding first adaptation value AD1, that is not the first adaptation value AD1 determined in step S8 during the current computation run of the program, and the correction value KW1. In this case account can be taken of the fact that as the duration D_AD1 since the last valid adaptation of the first adaptation value AD1 increases, especially if the correction value KW1 exceeds a predefined value, the correction value KW1 plays a greater role in the adaptation of the first adaptation value AD1. This allows simple account to be taken of the fact that if the operating point is rarely reached at which the predefined first operating conditions BB1 are fulfilled, but still if the allocation of the first adaptation value AD1 has been undertaken, a correspondingly heavy adaptation of the first adaptation value AD1 is undertaken and thereby a reduction of a possible error in the determination of the measured value and indeed of the corrected measured value MW_KOR.

After step S14 the processing is continued at step S2.

Figure 2A:
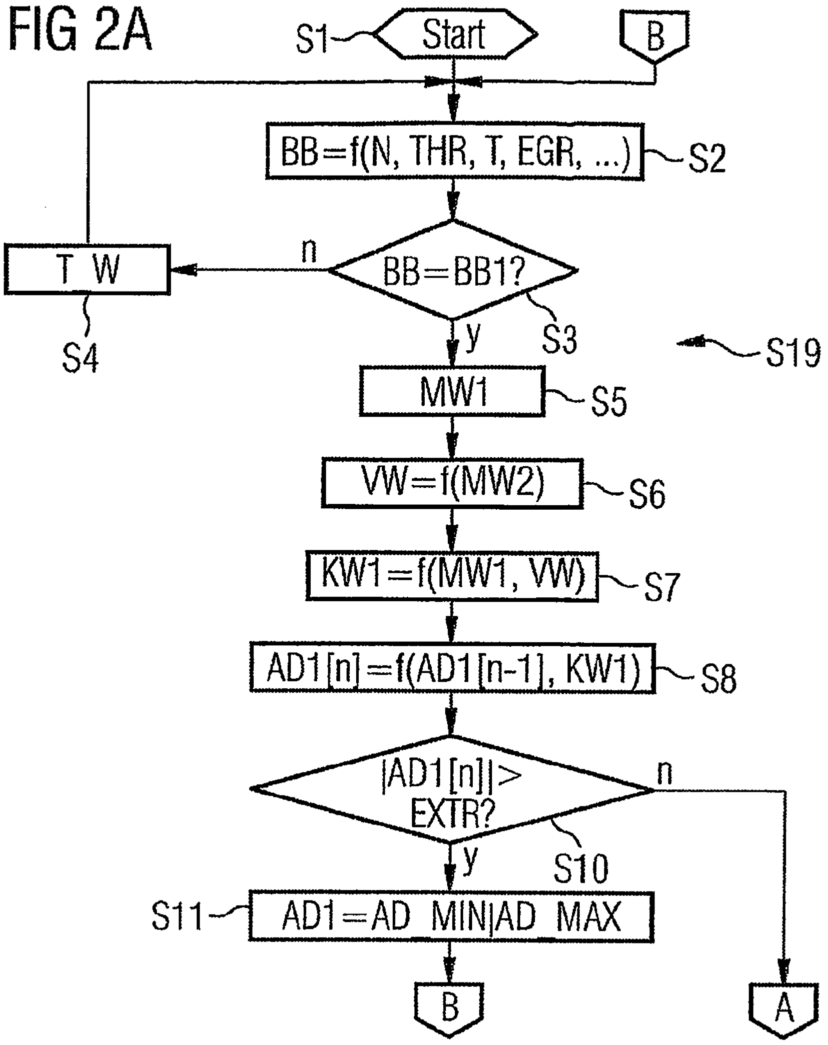
FIG. 2A, 2B a flowchart of a first embodiment of a program for adapting an adaptation value of an air mass sensor, FIGS. 3A and 3B a further flowchart of a second embodiment of a program for adapting a number of adaptation values and FIG. 4 a flowchart of a program to perform the adaptation of the measured values of the air mass sensor.
Figure 2B:
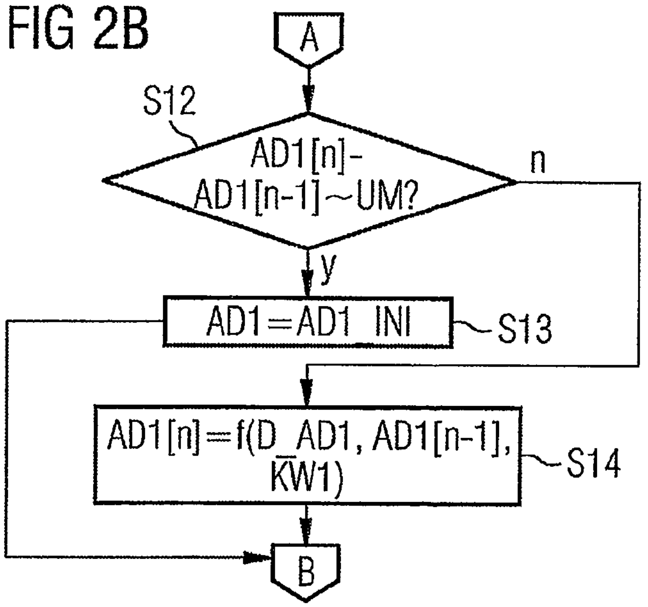
Figure 3A:
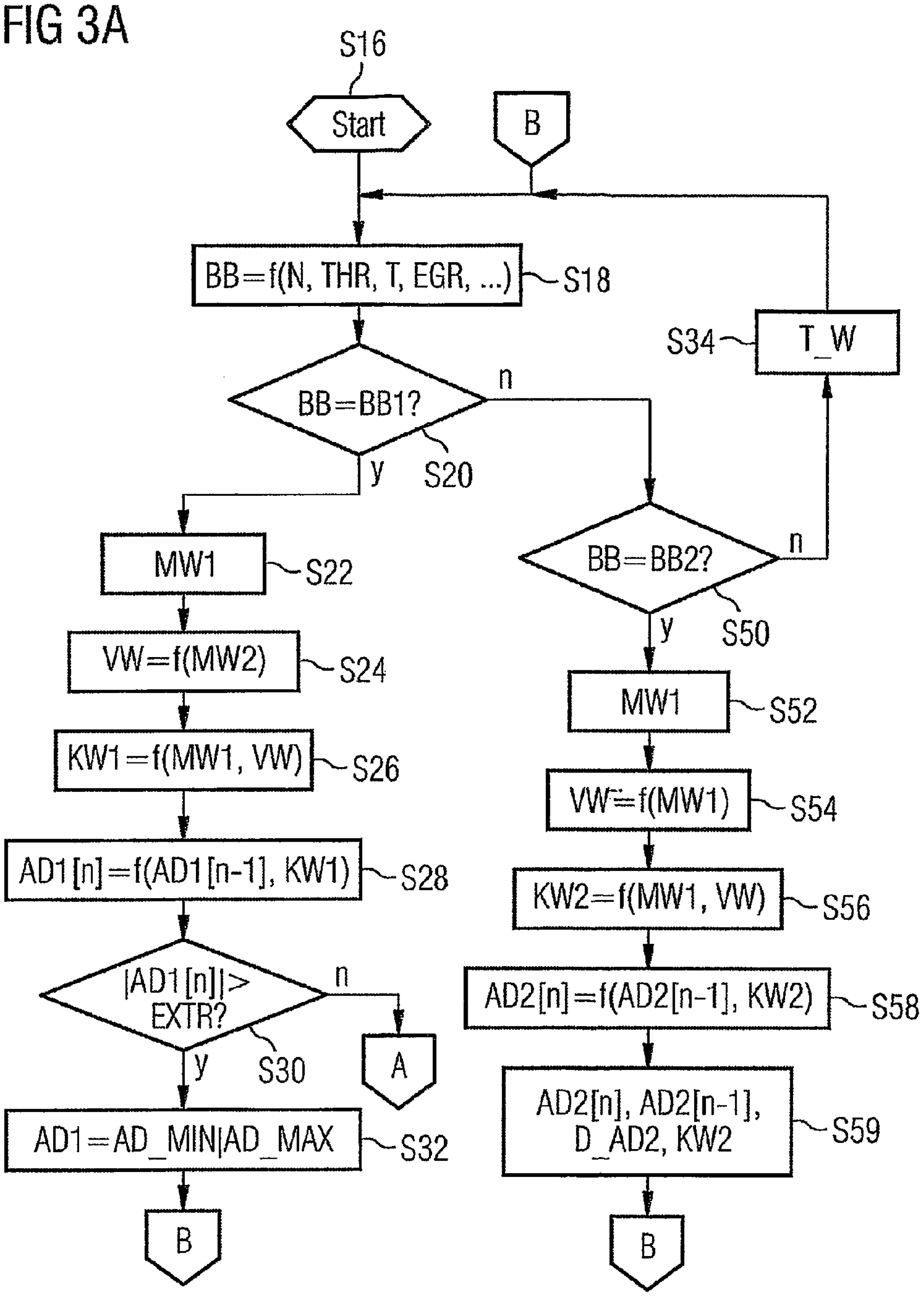
Figure 3B:
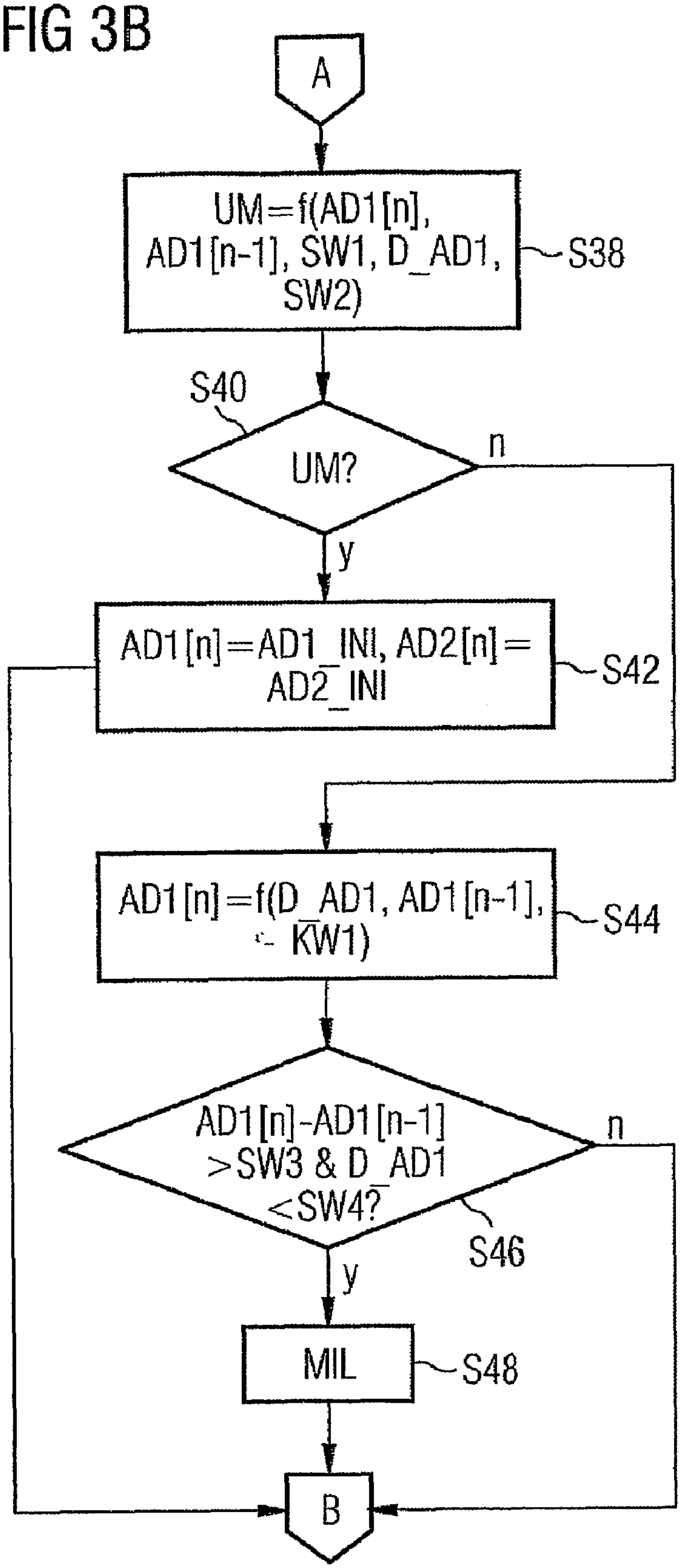

A second embodiment of the program for adaptation of adaptation values is described below with reference to FIGS. 3A and 3B and the flow diagrams shown in these figures. Only the differences from the program depicted in FIGS. 2A and 2B are described below.

The program is started in a step S16 in which variables are initialized where necessary. In a step S18 the current operating conditions corresponding to step S2 are determined. In a step S20 a check is subsequently performed as to whether the current operating conditions BB are the same as the predefined first operating conditions BB1, which for example can essentially be defined by the speed and e.g. can be fulfilled in relation to the speed if this as a value of around 1,000 RPM.

If the condition of step S20 is fulfilled, then in a step S22 the first measured value MW1 of the air mass sensor 14 is determined. In a step S24 the comparison value VW is subsequently determined and this is done depending on the second measured value MW2 of at least one further sensor. This further sensor is preferably the induction tube sensor 16 and accordingly a measured value of the induction tube pressure recorded by this sensor. In addition or as an alternative it can for example also be the crankshaft angle sensor which records the speed N of the crankshaft and/or a sensor which records the throttle setting THR of the throttle flap 11. Using a corresponding model the comparison value VW is then determined from these second measured values MW2.

In a step S26 the first correction value KW1 is subsequently determined depending on the first measured value MW1 and the comparison value. The comparison value VW is preferably considered in this case as the reference value, i.e. as the correct value. Thus in step S26 the first correction value KW1 is preferably determined from the difference between the comparison value VW and the first measured value MW1.

In a step S28 a current first adaptation value AD1 is subsequently determined, depending on the preceding first adaptation value AD1 and the correction value KW1. This is preferably done in accordance with step S8 by means of a first order filter. It can however also be done using a higher-order filter.

A check is made in a step S30 as to whether the amount of the first adaptation value, and indeed of the current first adaptation value, is greater than the extreme value EXTR. This is done in the same way as in step S10. If the condition of step S30 is fulfilled, processing is continued at a step S32 which corresponds to the step S11.

After step S32 processing of the program is continued at a step S18.

If the condition of step S30 is not fulfilled, then in a step S38 a value is determined which is characteristic for the unauthorized modification UM to the air mass sensor, preferably the air mass sensor 14. This is preferably done depending on the current first adaptation value AD1, the preceding first adaptation value AD1, a first threshold value SW1, the duration D_AD1 since the last valid adaptation of the first adaptation value AD1 and a second threshold value SW2. In this case the unauthorized modification UM to the air mass sensor 14 has occurred if the difference between the current and the preceding first adaptation value AD1, i.e. its change, is greater than the predefined first threshold value SW1 and simultaneously the duration D_AD1 since the last valid adaptation of the first adaptation value AD1 is less than the predefined second threshold value SW2.

In a step S40 a check is subsequently made as to whether an unauthorized modification UM to the air mass sensor has occurred. If its has, in the step S42 the current first adaptation value is set equal to the initialization value AD1_INI of the first adaptation value AD1 and this is done by using the initialization value AD1_INI of the first adaptation value AD1. In addition, in the step S42, a second adaptation value AD2 is also initialized with an initialization value AD2_INI of the second adaptation value AD2. This then ensures that all adaptation values AD1, AD2 are able to be adapted again unaffected by the preceding computation cycles AD1, AD2, and account is thus taken of the situation in which the air mass sensor was modified, e.g. replaced.

In a step S44, if the condition of step S40 is not fulfilled, the first adaptation value AD1 is determined again if necessary and this is done in accordance with step S14.

In a step S46 a check is then made as to whether the difference between the current adaptation value AD1 and the preceding first adaptation value AD1 is greater than a third threshold value and simultaneously the duration D_AD1 since the last adaptation of the first adaptation value AD1 is less than a predefined fourth threshold value SW4. If the condition of step S46 is not fulfilled, processing is continued if necessary after the predefined waiting time T_W in step S18.

If the condition of step S46 is fulfilled however, an error has occurred and processing is continued at a step S48. An error is detected if necessary only after the condition of step S46 has been fulfilled a number of times with consecutive calculation runs and an error reaction then occurs which for example can entail the malfunction indicator lamp MIL signaling an error to the driver of a motor vehicle in which the air mass sensor is located. Subsequently processing is continued if necessary after the predefined waiting time T_W, at step S18 again.

On the other hand, if the condition of step S20 is not fulfilled, i.e. the current operating conditions BB do not correspond to the predefined first operating conditions BB1, then in a step S50 a check is made as to whether the current operating conditions BB correspond to predefined second operating conditions BB2. The predefined second operating conditions BB2 very much depend for example on the speed N and are fulfilled in this regard if the speed has a value of around 3000 RPM.

If the condition of step S50 is not fulfilled, processing is continued at step S34. If the condition of step S50 is fulfilled however, then in a step S52 the first measured value MW1 of the air mass sensor 14 is recorded.

In a step S54 the second measured value MW2 of the further sensor, that is preferably of the induction tube pressure sensor 16, is subsequently recorded and for example of the crankshaft angle sensor 22 and then, depending on this or these second measured value(s) MW2, the comparison value VW is determined. This is done in the same way as in step S24 and step S6.

In a step S56 a second correction value KW2 is subsequently determined depending on the first measured value MW1 and the comparison value VW determined in step S52. This is done in the same way as in steps S26 and S7 by forming the difference.

In a step S58 the second adaptation value AD2 is adapted and this is done depending on the second adaptation value AD2 and the second correction value KW2 adapted in a preceding adaptation. This is also done in the same way as in step S28.

Subsequently a step S59 is processed which corresponds to the steps S32 to S48 adapted for the determination of the second adaptation value AD2, with then, in accordance with the duration D_AD1 since the last valid adaptation of the first adaptation value AD1 by a duration D_AD2, the duration since the last valid adaptation of the second adaptation value AD2, of the first correction value KW1 is replaced by the second correction value KW2. In addition the program can also be correspondingly tailored for adaptation of further adaptation values if third, fourth and further predefined operating conditions exist. The program depicted in FIGS. 3A, 3B can however also be correspondingly tailored merely for determining the first adaptation value AD1.

Figure 4:
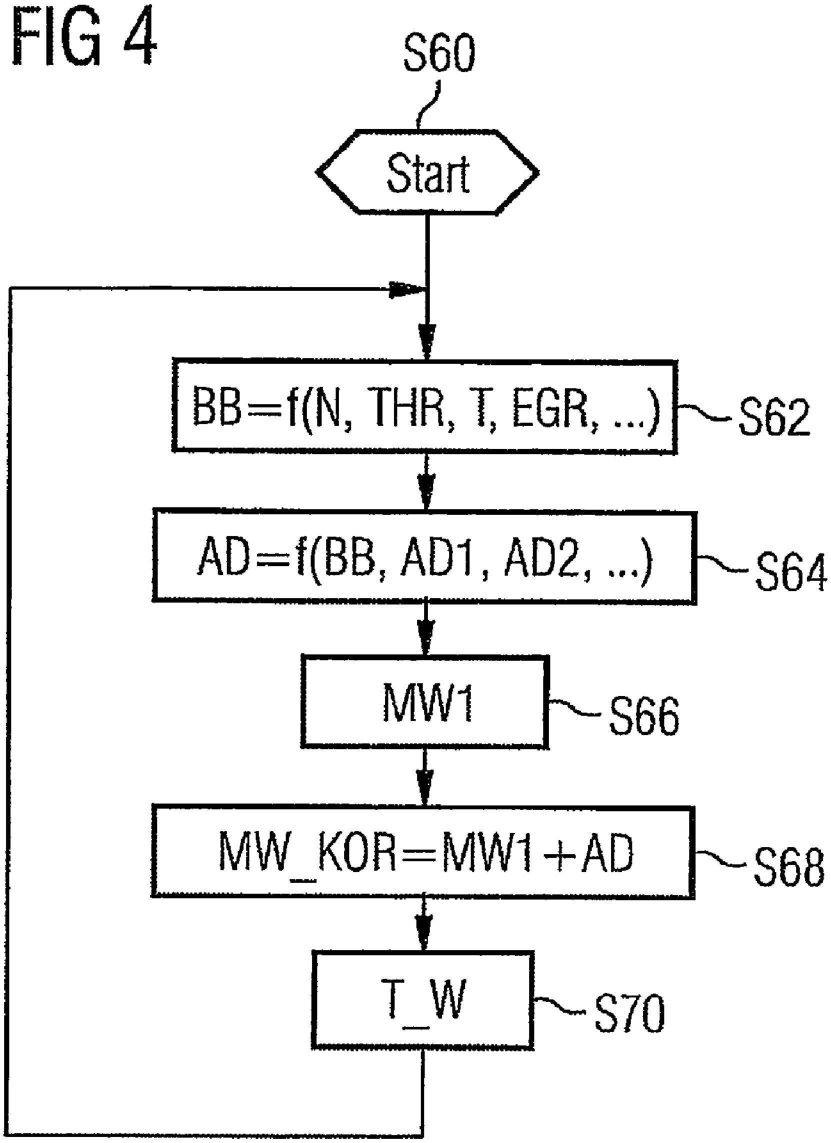

FIG. 4 shows a flowchart of a program by means of which the measured values MW1 of the air mass sensor 14 are corrected. The program is started in a step S60.

In a step S62 the current operating conditions BB are determined and this is done in the same way as in step S18. Where necessary the current operating conditions can be determined in step S62 that is only depending on one or more decisive measured values, thus for example merely depending on the speed N. In a step S66 the current adaptation value AD is then determined depending on the operating conditions BB determined in the step S62 and corresponding interpolation between the adaptation value or adaptation values AD1, AD2 determined and where necessary further variables.

In a step S66 the first measured value MW1 is then determined. In a step S68 a corrected first measured value MW_KOR is then determined by summing the first measured value MW1 and the current adaptation value AD. Subsequently the program idles for a predefined waiting time T_W in the step S70 before processing is continued again at step S62.

The adaptation value or adaptation values are basically stored and are thus available once more for each new start of the program.

What is claimed is:

1. A method for adapting a measured value of an air mass sensor, comprising the steps of:

determining a correction value, if predefined operating conditions exist, depending on the measured value and a comparison value which is determined depending on at least one further measured value of a further sensor, checking and adapting an adaptation value depending on the correction value, on the duration since the last adaptation of the adaptation value, and on the change in the adaptation value since the last adaptation of the adaptation value, and correcting measured values subsequently recorded with the adaptation value.

2. A method according to claim 1, wherein, as the duration since the last adaptation of the adaptation value increases, the adaptation value is adapted more heavily depending on the correction value.

3. A method according to claim 1, wherein, for a change in the adaptation value, which is characteristic for an unauthorized modification to the air mass sensor, the adaptation value is assigned an initialization value.

4. A method according to claim 3, wherein a negative change of the adaptation value, of which the amount is greater than a predefinable first threshold value, and a duration since the last determination of the correction value, which is less than a predefined second threshold value, are characteristic of the unauthorized modifications to the air mass sensor.

5. A method according to claim 1, wherein a positive change to the adaptation value, of which the amount is greater than a predefinable first threshold value, and a duration since the last determination of the correction value, which is less than a predefined second threshold value, are characteristic of an extraordinary contamination of the air mass sensor, and in which an error reaction occurs on detection of an extraordinary contamination.

6. A method according to claim 5, wherein the error reaction is an indication of an error, which occurs so that the driver of a motor vehicle in which the air mass sensor can be located recognizes that an error has occurred.

7. A method according to claim 1, wherein at least a first correction value and a second correction value are determined, wherein the first correction value is determined if predefined first operating conditions exits, and the second correction value is determined if predefined second operating conditions exist, and wherein, depending on the first correction value a first adaptation value is checked and adapted, and depending on the second correction value a second adaptation value is checked and adapted and measured values of the air mass sensor subsequently recorded are corrected with an adaptation value interpolated, depending on the current operating conditions, between the at least first and second adaptation value.

8. A method for adapting a measured value of an air mass sensor comprising the steps of:

determining a comparison value depending on at least one further measured value of a further sensor, determining a correction value depending on the measured value and the comparison value, checking and adapting an adaptation value depending on the correction value, on the duration since the last adaptation of the adaptation value, and on the change in the adaptation value since the last adaptation of the adaptation value, and correcting measured values subsequently recorded with the adaptation value.

9. A method according to claim 8, wherein, as the duration since the last adaptation of the adaptation value increases, the adaptation value is adapted more heavily depending on the correction value.

10. A method according to claim 8, wherein for a change in the adaptation value, which is characteristic for an unauthorized modification to the air mass sensor, the adaptation value is assigned an initialization value.

11. A method according to claim 10, wherein a negative change of the adaptation value, of which the amount is greater than a predefinable first threshold value, and a duration since the last determination of the correction value, which is less than a predefined second threshold value, are characteristic of the unauthorized modification to the air mass sensor.

12. A method according to claim 8, wherein a positive change to the adaptation value, of which the amount is greater than a predefinable first threshold value, and a duration since the last determination of the correction value, which is less than a predefined second threshold value, are characteristic of an extraordinary contamination of the air mass sensor, and in which an error reaction occurs on detection of an extraordinary contamination.

13. A method according to claim 12, wherein the error reaction is an indication of an error, which occurs so that the driver of a motor vehicle in which the air mass sensor can be located recognizes that an error has occurred.

14. A method according to claim 8, wherein at least a first correction value and a second correction value are determined, wherein the first correction value is determined if predefined first operating conditions exits, and the second correction value is determined if predefined second operating conditions exist, and wherein, depending on the first correction value a first adaptation value is checked and adapted, and depending on the second correction value a second adaptation value is checked and adapted and measured values of the air mass sensor subsequently recorded are corrected with an adaptation value interpolated, depending on the current operating conditions, between the at least first and second adaptation value.

* * * * *